United States Patent Office 3,716,450
Patented Feb. 13, 1973

3,716,450
DEVICE FOR REMOTE POSITIONING OF THERMO-COUPLES IN A NUCLEAR REACTOR
Noël Lions, Manosque, France, assignor to Commissariat a l'Energie Atomique, Paris, France
Filed Sept. 15, 1969, Ser. No. 857,791
Int. Cl. G21c 17/00
U.S. Cl. 176—19 R
5 Claims

ABSTRACT OF THE DISCLOSURE

Remote positioning of thermocouples in proximity to the fuel assemblies of a nuclear reactor core is carried out by means of a device comprising an elongated cylindrical guide tube secured at one open extremity to the seal plug of the reactor vessel whilst the other extremity is closed by an end-piece which is mounted in proximity to the fuel assemblies and which has a smaller internal cross-sectional area than the guide tube. The device essentially comprises a flexible metallic positioning arm which is capable of sliding within the interior of the guide tube and at least one thermocouple cable mounted inside the positioning arm. That end of the cable which carries the sensitive element of the thermocouple is attached to the exterior of an elastic clamp which is secured to the positioning arm. The open end of the positioning arm is engaged within the guide tube until it penetrates in the end-piece, thereby closing the clamp and bringing the sensitive element into contact with the surface of the end-piece.

---

This invention relates to a device for remote positioning of thermocouples in a region which is not readily accessible and normally prohibited, especially in the vicinity of fuel assemblies which constitute the core of a nuclear reactor.

The advantage of placing thermocouples in proximity to nuclear fuel assemblies is immediately apparent: by means of these measuring devices, the mean temperature of the reactor core coolant can be continuously checked as said coolant reaches the exit end of its flow path and is no longer in contact with the fuel assemblies. Accordingly, such devices make it possible to detect any reduction in the coolant flow rate with respect to the normal flow rate by measuring the correlative temperature rise; in particular, such a reduction in flow rate can result from clogging or from either partial or total obstruction of the coolant flow within the fuel assembly or group of assemblies which is being monitored.

The present invention is directed to a device whereby thermocouples can readily be positioned in or withdrawn from a nuclear reactor containment vessel without entailing shutdown of the reactor while additionally permitting both inspection and replacement of said thermocouples without any special difficulty.

To this end, said device comprises an elongated cylindrical guide tube rigidly fixed at one open end thereof to the nuclear reactor containment vessel and closed at the other end thereof by an end-piece which has a smaller internal cross-sectional area than said guide tube and is secured in position especially in the vicinity of the fuel assemblies, said device being characterized in that it comprises a flexible metallic positioning arm which is capable of sliding within the interior of said guide tube and at least one thermocouple cable mounted within said positioning arm, said cable being attached at that extremity which carries the sensitive element of said thermocouple to the exterior of an elastic clamp which is secured to said positioning arm, the open extremity of said positioning arm being engaged within said guide tube until it penetrates in said end-piece so as to produce the closure of said clamp and bring said sensitive element into contact with the surface of said end-piece.

Sliding of the positioning arm within the guide tube is carried out in such a manner as to prevent frictional contact of the clamp with the internal surface of the tube whilst the sensitive extremity of the thermocouple comes into contact with the end-piece only at the moment of penetration into this latter.

Apart from this main feature, the device in accordance with the invention also has secondary features which should preferably be considered at the same time but could be considered separately if necessary and relate more especially to the following points:

Said clamp has two opposite jaws, each jaw being associated with a thermocouple cable comprising an insulating sheath which surrounds the two electric lead wires;

Said thermocouple cable is brazed onto the internal surface of said positioning arm in the vicinity of that extremity which is remote from said clamp;

Said positioning arm has an extension in the form of a casing which contains a plug and socket assembly for providing a connection between said thermocouple cable and any suitable measuring instrument;

The space formed between said guide tube and said positioning arm is maintained in an atmosphere of neutral gas and especially in an argon atmosphere.

Further properties of the device in accordance with the invention will be brought out by the following description of one exemplified embodiment which is given by way of indication and not in any limiting sense, reference being had to the accompanying drawings, in which:

FIG. 1 is a diagrammatic view in elevation of the complete device under consideration;

FIGS. 2, 3 and 4 are enlarged part-sectional views of the extremities and of the intermediate portion of said device.

As has been stated earlier, the device under consideration is primarily intended to permit remote positioning of thermocouples in the vicinity of fuel element assemblies which make up a nuclear reactor core, this operation being carried out from the exterior of the reactor containment vessel.

There is shown diagrammatically in FIG. 1 the top portion 1 of a reactor containment vessel comprising a seal plug 2 through which extend a series of guide tubes such as the tube 3 for accommodating the thermocouples which are to be introduced into said vessel. Each tube has the shape of a glove finger and is rigidly fixed in position relative to the seal plug 2, especially by means of a top block 4 and bottom grid 5 and is fitted at the lower end thereof with an end-piece 6 as will be shown in constructional detail hereinafter. Said end-piece 6 is positioned in the immediate vicinity of the reactor core 7 which is formed by a series of fuel assemblies such as the assembly 8, the positioning operation being carried out by virtue of a cover-plate 9 located above the reactor core and provided with a through-passage for the insertion of the corresponding extremity of each guide tube 3. In addition and as is also illustrated in FIG. 1, said tubes 3 have an appreciable degree of curvature between the seal plug 2 and the cover-plate 9 in order that the corresponding end-pieces 6 may thus be brought into each desired position. The complete unit which is formed by the fuel assemblies 8, the cover-plate 9 and the lower ends of the guide tubes 3 is immersed in a circulating liquid medium 10 and especially liquid sodium which is employed as coolant for the fuel assemblies. Finally, the space 11 which is defined between the top level of the liquid medium 10 and the seal plug 2 is advantageously filled with an atmosphere consisting of a suitable neutral gas and especially argon.

FIGS. 2, 3 and 4 illustrate in greater detail the particular construction of any one of the guide tubes 3 referred-to above together with the components contained therein as devised for the purpose of inserting thermocouples and fitting these latter in position within the end-piece 6 thereby permitting the measurement of the coolant temperature in the vicinity of the fuel assemblies 8.

As shown in FIG. 2, the guide tube 3 considered is open at the upper extremity which is secured to the seal plug 2 of the containment vessel by means of a welded joint 12 so as to permit the engagement in said guide tube of a metallic positioning arm 13 which is intended to contain and displace therewith at least one thermocouple cable 14. In the example which is illustrated in the drawings, two thermocouple cables are provided as designated by the references 14a and 14b and are fixed in position with respect to the internal surface of the positioning arm 13 and in the vicinity of the upper extremity thereof by means of a sleeve 15 formed of brazing compound. At the lower extremity 16 (as shown in FIGS. 3 and 4), the positioning arm 13 is secured to a flexible clamp 18 by welding at 17. Said clamp has two opposite jaws 19 and 20 in which are formed grooves 21 and 22 for positioning and securing the ends 23a and 23b of the two cables 14a and 14b. As shown in FIG. 3, said jaws 19 and 20 are normally separated although the extremities of these latter do not come into contact with the internal surface 24 of the guide tube 3, thereby preventing frictional contact of the extremities 23a and 23b of the cables which comprise the sensitive elements of the corresponding thermocouples.

FIG. 4 shows on a larger scale the lower extremity of the guide tube 3 and of the end-piece 6 which is attached to this latter, especially by welding at 25. Said end-piece 6 has an internal cavity 26, the cross-sectional area of which is appreciably smaller than that of the guide tube 3. Under these conditions and in accordance with an essential arrangement of the invention, the engagement of the clamp 18 in the end-piece 6 at the end of travel automatically produces the closure of the jaws 19 and 20, thereby bringing the extremities 23a and 23b into contact with the internal surface of the end-piece which is rigidly fixed to the guide tube 3.

Finally, the equipment of the device is completed by means of a casing 27( as shown in FIG. 2) forming an extension of the positioning arm 13 at the top portion thereof and surrounding a plug and socket 28 which provides a connection between the thermocouple cables 14 and a suitable testing and measuring instrument (not shown in the drawings). The region which communicates with the internal space 11 of the guide tube 3 is filled with argon, leak-tightness with respect to the exterior being ensured on the one hand by means of the sleeve 15 of brazing compound and on the other hand by O-ring seals 29 placed between the external surface of the positioning arm 13 and the floor 30 which defines the top level of the reactor containment vessel.

The device for positioning thermocouples which is thus provided is of very simple design while having a very fast response time as well as permitting ready replacement of a defective thermocouple under any conditions of reactor operation.

A few details will now be given by way of indication in regard to the technical specifications of a device as constructed according to the invention and employed in a so-called "fast" nuclear reactor which is cooled by circulation of liquid sodium, the end-pieces of the guide tubes being placed at approximately 150 mm. above the heads of the fuel assemblies.

Temperature limit: between 100 and 700° C. at the lower ends of the guide tubes at the level of each end-piece which provides a contact with the sensitive elements of the thermocouples. The upper ends of the guide tubes are at approximately 60° C.;

Operating temperature under normal conditions: 560° C. at the level of the end-piece;

Total neutron flux: $6 \times 10^9$ n./cm.$^2$/sec.;

Maximum integrated total neutron flux: $2 \times 10^{18}$ n/cm.$^2$ in 100,000 hrs.;

Nature of end-piece: metal or alloy which is compatible with sodium and having a thermal conductivity $\geqslant 50$ w./m.° C. at 560° C. The end-piece is preferably formed of nickel and the guide tube of stainless steel;

Thermocouple: insulated chromel-alumel weld with magnesia insulator. Time of response of the uncovered thermocouple: 100 ms. in the range of 100 to 700° C. with excellent linearity and a precision of ± 2° C. Time of response within the guide tube: 2 to 3 secs.

It will of course be readily understood that the invention is not limited in any sense to the example of construction which has been more particularly described in the foregoing and illustrated in the drawings but extends to all alternative forms.

What I claim is:

1. A device for remote positioning of thermocouples in the vicinity of fuel element assemblies which constitute the core of a nuclear reactor, comprising an elongated cylindrical guide tube rigidly fixed at one open end thereof to the nuclear reactor containment vessel and closed by an end-piece at the other end thereof, characterized in that said end-piece which has a smaller internal cross-sectional area than said guide tube is secured in position especially in the vicinity of the fuel assemblies and that said device comprises a flexible metallic positioning arm which is capable of sliding within the interior of said guide tube and at least one thermocouple cable mounted within said positioning arm, said cable being attached at that extremity which carries the sensitive element of said thermocouple to the exterior of an elastic clamp which is secured to said positioning arm, the open extremity of said positioning arm being engaged within said guide tube until it penetrates in said end-piece so as to produce the closure of said clamp and bring said sensitive element into contact with the surface of said end-piece 2. A device in accordance with claim 1, characterzed in that said clamp has two opposite jaws, each jaw being associated with a thermocouple cable comprising an insulating sheath which surrounds the two electric lead wires.

3. A device in accordance with claim 2, characterized in that said thermocouple cable is brazed onto the internal surface of said positioning arm in the vicinity of that extremity which is remote from said clamp.

4. A device in accordance with claim 1, characterized in that said positioning arm has an extension in the form of a casing which contains a plug and socket assembly for providing a connection between said thermocouple cable and a suitable measuring instrument.

5. A device in accordance with claim 1, characterized in that the space which is formed between said guide tube and said positioning arm is maintained in a neutral gas atmosphere.

References Cited

UNITED STATES PATENTS

| | | | |
|---|---|---|---|
| 2,856,341 | 10/1958 | Kanne | 176—19 |
| 3,021,274 | 2/1962 | Fifield et al. | 176—19 |
| 3,132,077 | 5/1964 | Turovlin | 176—19 |
| 3,321,370 | 5/1967 | Oppenheimer | 176—19 |

REUBEN EPSTEIN, Primary Examiner

U.S. Cl. X.R.

73—343 R, 359